July 1, 1969 J. E. GEUSIC ET AL 3,453,604

OPTICAL MEMORY DEVICE EMPLOYING MULTIPHOTON-EXCITED FLUORESCING MATERIAL TO REDUCE EXPOSURE CROSSTALK

Filed Nov. 15, 1966

INVENTORS J. E. GEUSIC
S. SINGH

BY Lyman Sherman

ATTORNEY 3,453,604

OPTICAL MEMORY DEVICE EMPLOYING MULTI-PHOTON-EXCITED FLUORESCING MATERIAL TO REDUCE EXPOSURE CROSSTALK

Joseph E. Geusic, Berkeley Heights, and Shobha Singh, Summit, N.J., assignors to Bell Telephone Laboratories, Incorporated, Murray Hill, N.J., a corporation of New York Filed Nov. 15, 1966, Ser. No. 594,531
Int. Cl. G11b 7/04
U.S. Cl. 340—173 4 Claims This invention relates to optical memories and, more specifically, to optical memories utilizing an element of a multiphoton-excited fluorescing material to reduce exposure crosstalk.

Figure 1:
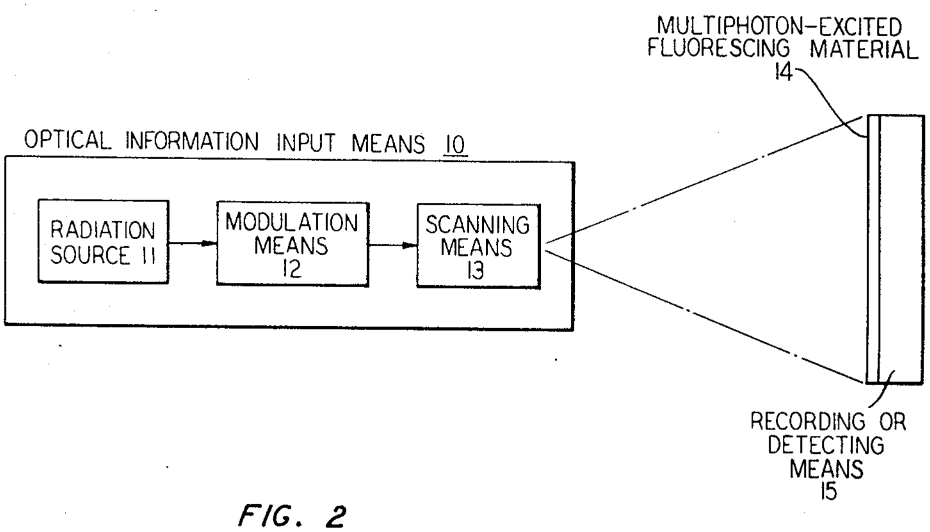

Optical memory systems show considerable promise for use in the next generation of data processing systems because they possess advantages of electrical isolation, low dispersion, parallel propagation and high resolution. (See R. D. Stewart, Storing Data With Light, Electronic, 39:82, Feb. 21, 1966.)

An important goal in the development of optical memories is the reduction in the amount of exposure crosstalk inadvertently introduced onto variable density storage masks. A number of optical memory systems now being developed utilize variable density masks, such as photographic plates or slabs of photochromic material, as information storage elements. For example, both the beam modulation method and the beam deflection technique use masks to store information in binary code. Typically, the variable density mask is responsive to a modulated light beam, and in the original data input the beam is directed to expose a plurality of spots on the mask. The information is then stored in the form of opaque or transparent spots corresponding to 1 and 0 bits of information. However, light directed to one spot inevitably has some overlap onto other adjacent spots, and accumulated inadvertent exposures introduce unwanted false information termed "exposure crosstalk."

Accordingly, the broad object of the present invention is to reduce exposure crosstalk in an optical memory system.

The present invention makes use of the phenomenon of multiphoton-excited fluorescence. It has been previously observed that some materials absorb radiation by a process in which a plurality of photons are absorbed in a single atomic transition and that some of these multiphoton absorbing materials exhibit fluorescence whose intensity is a nonlinear function of the intensity of the exciting radiation. (See Singh and Bradley, Three-Photon Absorption in Napthalene Crystals by Laser Excitation, Physical Review Letters, 12:612 (1964); Singh and Stoicheff, Double-Photon Excitation of Fluorescence in Anthracene Single Crystals, Journal of Chemical Physics, 38:2032 (1963) and references cited therein.) Typically, multiphoton-excited fluorescence is emitted when the intensity of the exciting radiation exceeds some characteristic threshold value. The intensity of the resulting fluorescence is proportional to the $n$th power of the exciting intensity, where $n$ is the number of photons simultaneously absorbed. It has been discovered that this nonlinear intensity dependence of multi-photon-excited fluorescing materials can be utilized to produce an improved optical memory system having reduced exposure crosstalk.

The present invention utilizes the above-described intensity characteristic by the addition of an element of multiphoton-excited fluorescing material to the data input circuit, and by the use of a recording medium which is selectively responsive to the fluorescent radiation. Rather than being used to expose the recording medium directly, the input beam is used to excite nonlinear fluorescence in the multiphoton absorbing material which, in turn, activates the recording medium. Since the ratio of the intensity of the light which strays from the main beam (and causes crosstalk) to the intensity of the main portion of the beam is generally a small fraction, the ratio of the corresponding intensities of multiphoton-excited fluorescence is much smaller, as it is the same fraction raised to the $n$th power. The net result is a substantial reduction in the level of exposure crosstalk.

Figure 2:
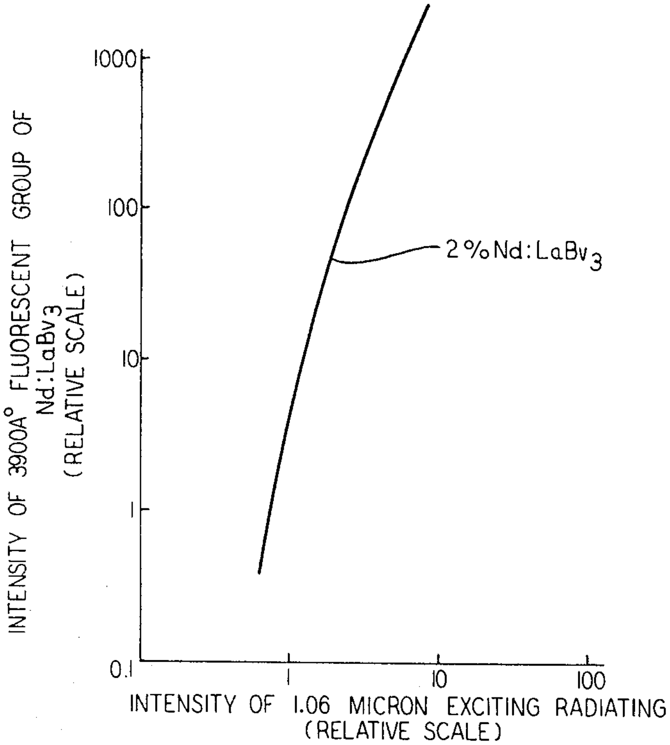

The invention may now be described in greater detail by reference to the accompanying drawings wherein:

FIG. 1 is a block diagram of a typical memory system in accordance with the invention; and FIG. 2 is a graphical representation of a typical observed relation between the intensity of incident radiation and that of multiphoton-excited fluorescence in $Nd^{3+}$:$LaBr_3$.

In FIG. 1, which illustrates a typical embodiment of the invention, there is shown an optical memory system comprising an optical information input means 10, an element of an appropriate multiphoton-excited fluorescing material 14, and a recording or detecting means 15 selectively responsive to fluorescent radiation from the multiphoton element 14.

The input means 10 typically comprises a high intensity monochromatic radiation source 11, such as an optical maser, a modulating means 12 to modulate the output beam from the source 11 in accordance with the information content to be stored, and a scanning means 13. The modulating means 12 is used to modulate the intensity of the beam impinging upon the multiphoton-excited fluorescing element from a value in excess of the aforementioned characteristic threshold intensity of the multiphoton-excited fluorescing material to a value less than this threshold intensity. The scanning means 13, which can be one of the many known types of beam deflectors, such as electro-optic crystal deflectors or acoustical deflectors, is used to direct the modulated beam toward information-significant positions on the recording means 15.

An appropriate material for the multiphoton-excited fluorescing element 14 is a material which both absorbs radiation from the input means 10 by a multiphoton process and fluoresces when the intensity of the input means exceeds the aforementioned threshold level. Such a material is typically characterized by a relatively unpopulated quantum energy level $E_2$ having a value higher than that of its steady-state level $E_1$ by an amount of energy equal to an integral multiple, $n$, of the energy of a photon of radiation from the source 11. Since the energy of a photon of frequency, $f$, is given by $hf$ where $h$ is Planck's constant, the relation between the energy levels of the material and the frequency of the source is given by the formula, $$E_2 - E_1 = nhf$$

In addition, the parity of the initial and final energy states must be the same if $n$ is even and opposite if $n$ is odd. (Note: In some materials the transitions are more complex. See, for example, the discussion of neodymium multiphoton processes in the copending application by Geusic-Singh, Ser. No. 587,330, filed Oct. 17, 1966, and assigned to applicant's assignee.)

Many, but not all materials meeting the aforementioned requirements exhibit multiphoton-excited fluorescence. Typically, they are multiphoton absorbers in that they absorb radiation by a multiphoton process when the intensity of the exciting radiation exceeds the characteristic threshold level. However, not all multiphoton absorbers fluoresce. As a general rule, materials which exhibit ordinary fluorescence for ordinary transitions between the $E_1$ and $E_2$ energy states also exhibit multiphoton-excited fluorescence for a multiphoton transition between these two levels. Since, however, different selection rules are applicable to the two different types of transitions, multiphoton-excited fluorescence is sometimes observed in materials which do not ordinarily fluoresce. (For a rigorous treatment of two-photon absorption and fluorescence, see J. D. Axe, Jr., Two-Photon Processes in Complex Atoms, Physical Review, 136A:42, 1964.) Examples of multiphoton-excited fluorescing materials appropriate for use in a memory system using a 1.06 micron optical maser as a radiation source include $Nd^{3+}:LaBr_3$, $NdCl_3$, $Nd^{3+}:LaCl_3$, $NdBr_3$, $NdI_3$, $U^{3+}:LaBr_3$, $U^{3+}:LaCl_3$, $NpCl_3$, $Np^{3+}:LaCl_3$ and $Np^{3+}:LaBr_3$.

When a memory system in accordance with the invention is in operation, the information-modulated beam from input means 10 impinges upon the multiphoton-excited fluorescing element 14 and causes fluorescence. The fluorescent radiation, in turn, activates the detecting or recording means 15 directly behind it.

The effect of this invention in reducing crosstalk may be illustrated by consideration of the specific example of an embodiment using a 1.06 micron laser in combination with an $Nd^{3+}:LaBr_3$ multiphoton fluorescing element, and a digital light deflector such as that disclosed by Nelson in Digital Light Deflection, Bell System Technical Journal, 43:821 (1964).

FIG. 2, which is a graphical representation of the observed relationship between the intensity of 3900 angstrom fluorescence from $Nd^{3+}:LaBr_3$ and the intensity of the 1.06 micron exciting radiation, shows that the fluorescent intensity varies as the fourth power of the 1.06 micron radiation.

It can be shown that $10^6$ image points per square inch can be achieved using this system with crosstalk of only −23 decibels while a comparable conventional system has crosstalk of −6 decibels. This represents a substantial improvement in digital light deflector performance.

It is understood that the above-described arrangement is simply illustrative of one of the many possible specific embodiments which can represent applications of the principles of the invention. For example, while the invention is referred to in the specific context of an optical memory system, clearly it is useful in any optical system in which a low level of crosstalk is advantageous. Thus, numerous and varied other arrangements can readily be devised in accordance with these principles by those skilled in the art without departing from the spirit and scope of the invention.

What is claimed is:

1. A system for indicating the presence or absence of information comprising, in combination:

an optical information input means having a given frequency and an intensity which varies above and below a preselected threshold level;

an element of a multiphoton-excited fluorescing material which, in response to radiation from said source having an intensity in excess of said threshold level, emits fluorescent radiation having a frequency different from that of said source;

and means for selectively detecting said fluorescent radiation.

2. A system as in claim 1 wherein said optical information input means comprises a source of radiation at said given frequency, a means for modulating the intensity of radiation from said source above and below said threshold level, and means for deflecting a beam of said radiation over the surface of said multiphoton-excited fluorescing element.

3. A system as in claim 1 wherein said optical information input means includes a 1.06 micron radiation source and said multiphoton-excited fluorescing element is made of a material chosen from the group consisting of $Nd^{3+}:LaBr_3$, $NdCl_3$, $Nd^{3+}:LaCl_3$, $NdBr_3$, $NdI_3$, $U^{3+}:LaBr_3$, $U^{3+}:LaCl_3$, $NpCl_3$, $Np^{3+}:LaCl_3$ and $Np^{3+}:LaBr_3$.

4. A system as in claim 1 wherein said optical information input means includes a 1.06 micron optical maser and said multiphoton-excited fluorescing element is $Nd^{3+}:LaBr_3$.

References Cited

UNITED STATES PATENTS

| | | | |
|---|---|---|---|
| 3,252,103 | 5/1966 | Geusic et al. | 330—4.3 |
| 3,341,825 | 9/1967 | Schrieffer | 340—173 |
| 3,355,674 | 11/1967 | Hardy | 340—4.3 X |
| 3,363,240 | 1/1968 | Cola et al. | 313—108 X |

BERNARD KONICK, *Primary Examiner.*

JOSEPH F. BREIMAYER, *Assistant Examiner.*

U.S. Cl. X.R.

313—92; 330—4.3